(12) United States Patent
Nguyen et al.

(10) Patent No.: US 11,703,362 B2
(45) Date of Patent: Jul. 18, 2023

(54) OVERMOLDED PADDLEWHEEL FOR A FLOW METER

(71) Applicant: Blue-White Industries, Ltd., Huntington Beach, CA (US)

(72) Inventors: John T. Nguyen, Fountain Valley, CA (US); Robert E. Gledhill, III, Huntington Beach, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

(21) Appl. No.: 17/445,480

(22) Filed: Aug. 19, 2021

(65) Prior Publication Data

US 2023/0015391 A1 Jan. 19, 2023

Related U.S. Application Data

(60) Provisional application No. 63/203,309, filed on Jul. 16, 2021.

(51) Int. Cl.
*G01F 1/075* (2006.01)
*B29D 99/00* (2010.01)

(52) U.S. Cl.
CPC ....... *G01F 1/0755* (2013.01); *B29D 99/0025* (2013.01)

(58) Field of Classification Search
CPC ........ G01F 1/075; G01F 1/0755; G01F 1/115; G01F 1/1155; B29D 99/0025
See application file for complete search history.

(56) References Cited

U.S. PATENT DOCUMENTS

| | | | |
|---|---|---|---|
| 6,487,919 B1 * | 12/2002 | Edwards | G01F 1/12 73/861.77 |
| 6,534,894 B1 * | 3/2003 | Flowerday | H02K 21/24 310/156.32 |
| 7,001,153 B2 | 2/2006 | McDowell et al. | |
| 7,284,964 B2 | 10/2007 | McDowell et al. | |
| 8,215,931 B2 | 7/2012 | McDowell et al. | |
| 8,418,364 B2 | 4/2013 | McDowell et al. | |
| 8,639,363 B2 | 1/2014 | Gledhill, III et al. | |
| 9,374,024 B2 | 6/2016 | Nguyen et al. | |
| 9,389,109 B2 | 7/2016 | Gledhill, III et al. | |
| 9,777,720 B2 | 10/2017 | Gledhill, III et al. | |
| 9,828,984 B2 | 11/2017 | Gledhill, III et al. | |
| 9,909,579 B2 | 3/2018 | Gledhill, III et al. | |
| 9,996,089 B2 | 6/2018 | Gledhill, III et al. | |
| 10,330,094 B2 | 6/2019 | Gledhill, III et al. | |
| 10,377,097 B2 * | 8/2019 | Canatella | B29D 15/00 |
| 10,948,320 B2 | 3/2021 | Gledhill, III et al. | |

(Continued)

FOREIGN PATENT DOCUMENTS

| | | |
|---|---|---|
| CN | 208721162 U | 4/2019 |
| JP | 2009-204461 A | 9/2009 |
| WO | WO 2004/010088 A1 | 1/2004 |

*Primary Examiner* — Erika J. Villaluna
(74) *Attorney, Agent, or Firm* — Knobbe, Martens, Olson & Bear, LLP

(57) ABSTRACT

A method of fabricating a paddlewheel for a flow meter is provided. The method can include providing an inner part of the paddlewheel. The method can also include inserting a plurality of magnets in the inner part of the paddlewheel. The method can also include overmolding an outer part of the paddlewheel over the inner part of the paddlewheel.

13 Claims, 6 Drawing Sheets

(56) References Cited

U.S. PATENT DOCUMENTS

| | | | |
|---|---|---|---|
| 11,131,300 B2 | 9/2021 | Gledhill, III et al. | |
| 11,150,118 B2 | 10/2021 | Gledhill, III et al. | |
| 11,221,004 B2 | 1/2022 | Gledhill, III et al. | |
| 11,261,857 B2 | 3/2022 | Gledhill, III et al. | |
| D959,238 S | 8/2022 | Nguyen et al. | |
| 11,402,248 B2 | 8/2022 | Gledhill, III et al. | |
| 11,485,653 B2 | 11/2022 | Gledhill, III et al. | |
| 11,578,716 B2 | 2/2023 | Gledhill, III et al. | |
| 2005/0048349 A1* | 3/2005 | Fannon | H01M 8/2455 |
| | | | 429/510 |
| 2010/0005655 A1 | 1/2010 | Nguyen | |
| 2010/0215478 A1 | 8/2010 | Oda et al. | |
| 2011/0180172 A1 | 7/2011 | Gledhill, III et al. | |
| 2015/0211509 A1 | 7/2015 | Gledhill, III et al. | |
| 2018/0291886 A1 | 10/2018 | Gledhill, III et al. | |
| 2018/0298891 A1 | 10/2018 | Gledhill, III et al. | |
| 2020/0149522 A1 | 5/2020 | Gledhill, III et al. | |
| 2020/0386593 A1 | 12/2020 | Nguyen et al. | |
| 2021/0047209 A1 | 2/2021 | Gledhill, III et al. | |
| 2021/0054963 A1 | 2/2021 | Nguyen et al. | |
| 2021/0064735 A1 | 3/2021 | Gledhill, III et al. | |
| 2021/0324845 A1 | 10/2021 | Nguyen et al. | |
| 2021/0348602 A1 | 11/2021 | Nguyen et al. | |
| 2022/0029481 A1* | 1/2022 | Huang | H02K 5/10 |
| 2022/0034693 A1 | 2/2022 | Gledhill, III et al. | |
| 2022/0099083 A1 | 3/2022 | Gledhill, III et al. | |
| 2022/0276082 A1 | 9/2022 | Gledhill, III et al. | |
| 2022/0316463 A1 | 10/2022 | Gledhill, III et al. | |

\* cited by examiner

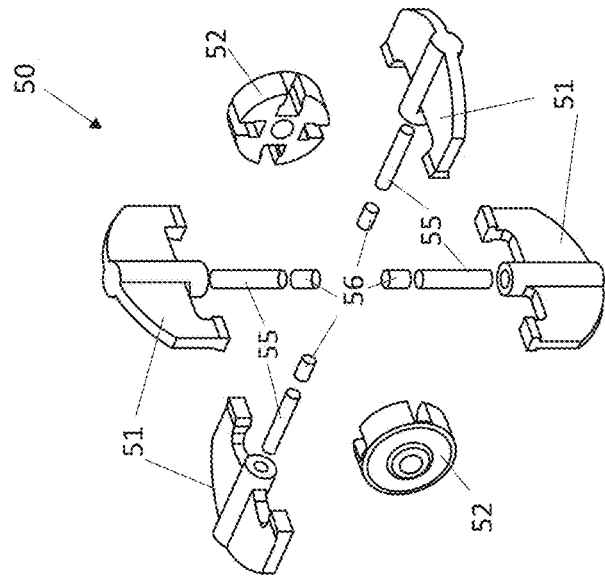
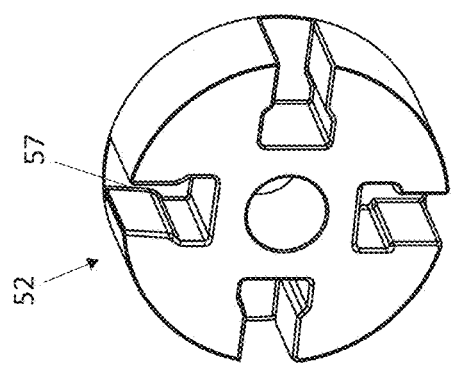
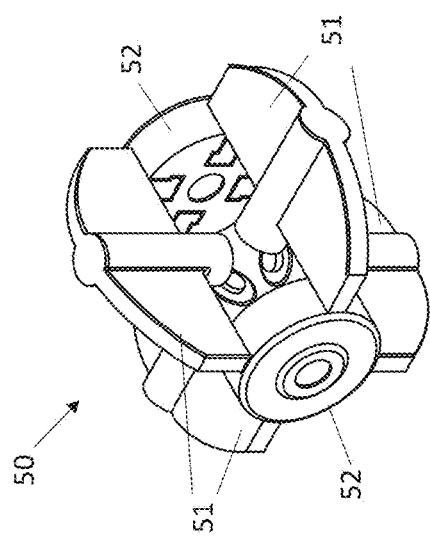
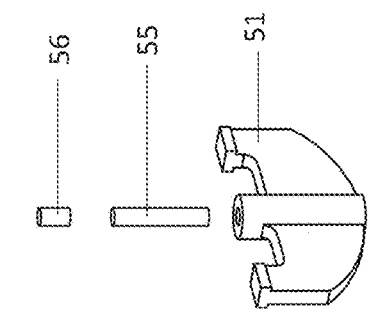

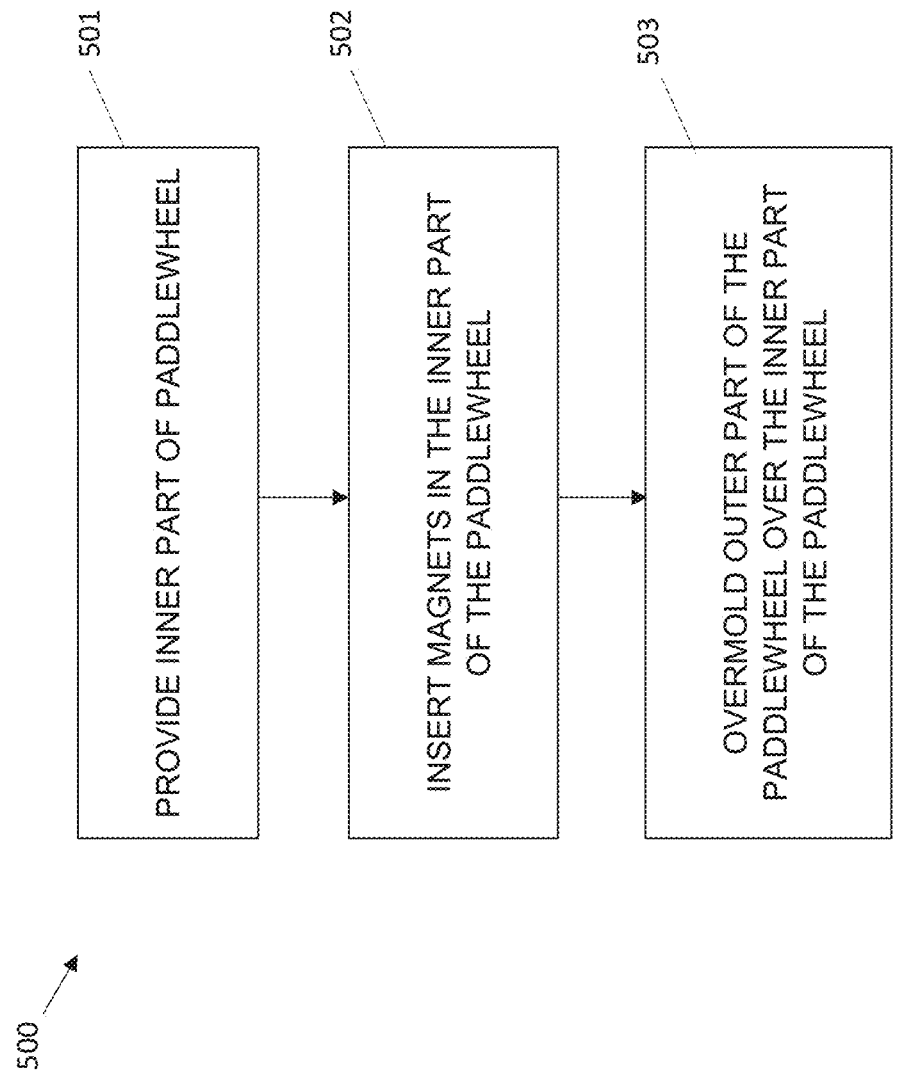

OVERMOLDED PADDLEWHEEL FOR A FLOW METER

INCORPORATION BY REFERENCE TO ANY PRIORITY APPLICATIONS

This application claims priority to U.S. Provisional Application No. 63/203,309, filed Jul. 16, 2021, and entitled "OVERMOLDED PADDLEWHEEL FOR A FLOW METER," the disclosure of which is hereby incorporated by reference in its entirety.

BACKGROUND

Field

The present disclosure relates generally to paddlewheels for flow meters and methods of fabricating the same.

Description of the Related Art

Paddlewheel flow meters are typically designed to measure flow of liquid in a pipe. The paddlewheel is one of the important components equipped in paddlewheel flow meters. The paddlewheel can rotate along with the flow of the liquid and the rotational speed of the paddlewheel can be used to help determine the flow rate.

SUMMARY

Unfortunately, the assembly process used for years to manufacture paddlewheels is tedious and time-consuming. In various implementations, a method of fabricating a paddlewheel for a flow meter is provided. The method can include providing an inner part of the paddlewheel, inserting a plurality of magnets in the inner part of the paddlewheel, and overmolding an outer part of the paddlewheel over the inner part of the paddlewheel.

In some implementations, providing an inner part of the paddlewheel can include providing an inner part of the paddlewheel that is pre-molded.

In some instances, the method can include inserting the inner part of the paddlewheel into a jig and using the jig to at least partially align the plurality of magnets with the inner part of the paddlewheel to facilitate the inserting of the plurality of magnets.

In some instances, the inner part of the paddlewheel can comprise a first partial blade and a second partial blade secured to a hub. In some instances, the first partial blade and the second partial blade can be secured on opposite sides of the hub.

In some instances, the method can include inserting the inner part of the paddlewheel into a recess in a jig so that the first partial blade and the second partial blade straddle the recess and using the jig to assist the insertion of plurality of magnets in the inner part of the paddlewheel.

In some instances, the first partial blade can have a first cavity configured to receive a first magnet of the plurality of magnets. In some instances, the second partial blade can have a second cavity configured to receive a second magnet of the plurality of magnets.

In some instances, inserting the plurality of magnets can include inserting the first magnet into the first cavity and inserting the second magnet into the second cavity. In some instances, the magnets can be inserted in the respective cavities simultaneously.

In various methods, overmolding can comprise closing the first cavity and the second cavity and securing the outer part to a first side and a second side of the hub.

In some designs, the inner part of the paddlewheel can comprise a third partial blade and a fourth partial blade secured to a hub. In some instances, the third partial blade and the fourth partial blade can be secured on opposite sides of the hub.

In some instances, the third partial blade can have a third cavity configured to receive a third magnet of the plurality of magnets. In some instances, the fourth partial blade can have a fourth cavity configured to receive a fourth magnet of the plurality of magnets.

In some instances, inserting the plurality of magnets can include inserting the third magnet into the third cavity and inserting the fourth magnet into the fourth cavity. In some instances, the magnets can be inserted in the respective cavities simultaneously.

In some methods, overmolding can comprise closing the third cavity and the fourth cavity and securing the outer part to a third side and a fourth side of the hub.

In some instances, the method can include checking the polarity of the magnets prior to overmolding the outer part over the inner part.

In some implementations, the method can be performed within 1 minute (e.g., within 55 seconds, within 50 seconds, within 45 seconds, within 40 seconds, within 35 seconds, etc.).

In various implementations, a paddlewheel assembly is provided. The paddlewheel assembly can include a hub and at least two partial blades secured to the hub. In some instances, the partial blades can be secured on opposite sides of the hub. In some instances, the paddlewheel assembly can include a cavity in each of the at least two partial blades configured to receive a magnet.

In some instances, the paddlewheel assembly can further include an outer portion closing the cavity in each of the at least two partial blades. In some instances, the outer portion can be secured to a first side and a second side of the hub.

In some designs, the paddlewheel assembly can further include at least two additional partial blades secured to the hub. In some instances, the at least two additional partial blades can be secured on opposite sides of the hub.

In some implementations, the paddlewheel assembly can also include a cavity in each of the at least two additional partial blades configured to receive a magnet. In some instances, the outer portion can close the cavity in each of the at least two additional partial blades.

In some instances, the outer portion can be secured to a third side and a fourth side of the hub.

BRIEF DESCRIPTION OF THE DRAWINGS

FIG. 5 shows an example assembled paddlewheel.

FIG. 6 shows an example blade of the paddlewheel shown in FIG. 5 receiving a magnet and plug.

FIG. 7 shows an example hub of the paddlewheel shown in FIG. 5.

FIG. 8 shows an exploded view of example components of the paddlewheel shown in FIG. 5.

FIG. 15 shows a flow diagram of an example method of fabricating a paddlewheel for a flow meter in accordance with certain implementations described herein.

DETAILED DESCRIPTION

Figure 2:
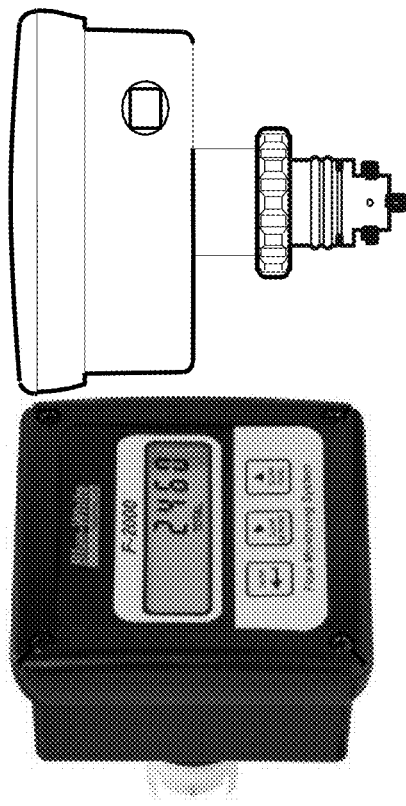
FIGS. 1 and 2 show example paddlewheel flow meters.
Figure 4:
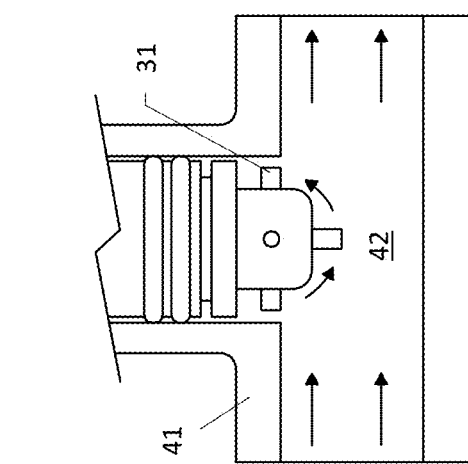
FIG. 4 shows a visual of paddlewheel rotation in a pipe.
Figure 1:
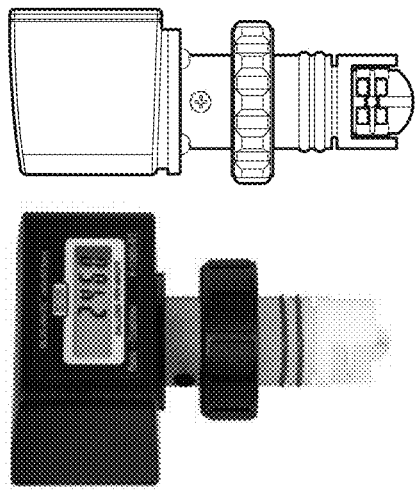

FIGS. 1-2 show two example paddlewheel flow meters. Functioning in the flow meter, the paddlewheel rotates on a shaft or axle. As illustrated in the example paddlewheel sensor subassembly 30 shown in FIG. 3, a paddlewheel 31 can be disposed on an axle 32 which can be received by a sensor body 33 of the flow meter. FIG. 4 shows a visual of the paddlewheel rotation on a pipe 41. The liquid 42 in the pipe 41 can flow in either direction and the paddlewheel 31 can rotate along with the flow. In many instances, the rotational speed of the paddlewheel is dependent on the flow of the liquid flowing in a pipe. As the paddlewheel rotates, a voltage signal can be generated with an amplitude and frequency proportional to the flow rate of the liquid. This generated signal can be captured and sent to the electronic circuitry to be processed and displayed in terms of a selectable engineering unit such as gallons per minute (GPM), gallons per hour (GPH), liters per minute (LPM), etc., representing the flowrate of a flowing liquid in a pipe.

For many years, each paddlewheel has been manually assembled, requiring frequent examination to ensure integrity and accuracy. For example, FIG. 5 shows an example assembled paddlewheel 50. In this example, there are four blades 51 assembled between two hubs 52. With reference to FIG. 6, each blade 51 typically received a magnet 55 and a plug 56 to keep the magnet 55 within the blade 51. Because of the small sizes of the components, a handling tool (e.g., tweezers) was generally used. The plug 56 was affixed to the blade 51 and/or magnet 55. For example, the plug 56 was generally attached to the blade 51 and/or magnet 55 with an adhesive. After the adhesive dried, the four blades 51 were affixed on one side to the example hub 52 shown in FIG. 7. For example, the blades 51 were typically placed within slots 57 of the hub 52 with an adhesive. After the adhesive dried, the four blades 51 were affixed on the other side to another hub 52. Because the glue connection would sometimes fail, a solder iron was used to melt the blades 51 and hub 52. FIG. 8 shows an exploded view of the components of the example prior art paddlewheel 50. This assembly process is tedious, time-consuming, and difficult. The total labor time to produce one paddlewheel would often be about 4.5 to 5 minutes.

Figure 13:
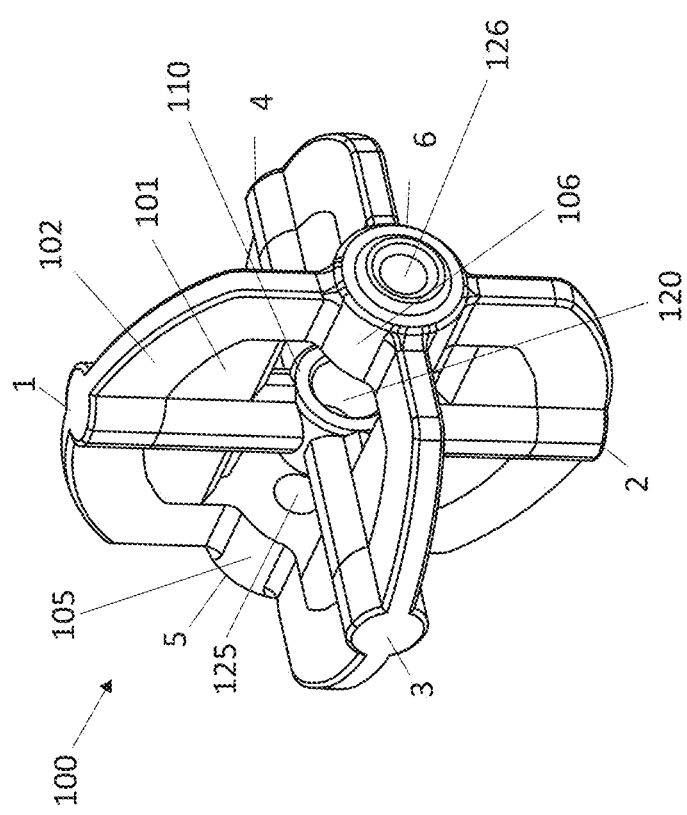
FIG. 13 shows an example paddlewheel assembly in accordance with certain implementations described herein.

Various implementations described herein provide an overmolded paddlewheel 100 (e.g., see FIG. 13). Some methods and designs allow for the production of a robust, cost-saving paddlewheel with a reduced amount of manual and tedious assembly work. The method is also easier for workers to perform. In addition, wasted parts due to mistakes during a more manual assembly can be reduced. In some embodiments, the total labor time to produce one paddlewheel can be less 1 minute, less than 55 seconds, or less than 50 seconds, e.g., about 35 to 45 seconds.

In some embodiments, including the preferred embodiment disclosed herein, the manufacturing process of the overmolded paddlewheel is simple, cost-effective, and efficient. An example process is shown in FIGS. 9-13. The exact design (e.g., shape, size, etc.) of the paddlewheel can vary. For example, although there are four blades in this example, the number (e.g., one, two, three, four, five, six, etc.) of blades is not limiting unless the number of blades is explicitly claimed.

Figure 9:
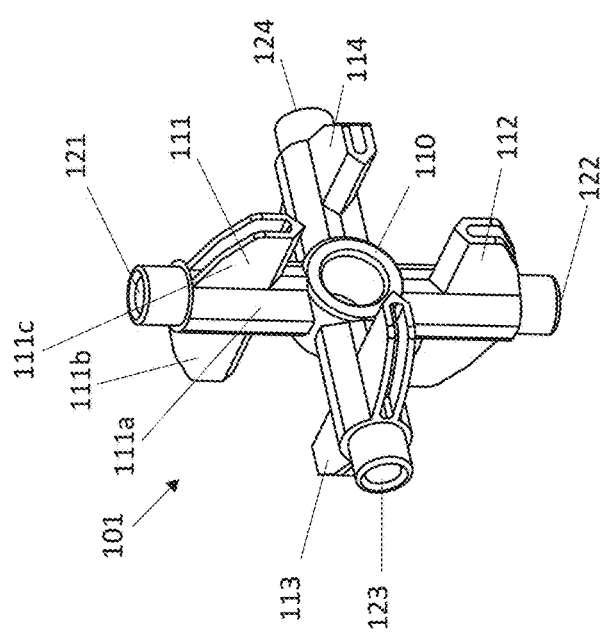
FIG. 9 shows an example inner part of a paddlewheel assembly in accordance with certain implementations described herein.

With reference to FIG. 9, a molded inner part 101 of the paddlewheel 100 is provided. The inner part 101 of the paddlewheel 100 can be pre-molded. The inner part 101 can be made with any paddlewheel material, e.g., a fluoropolymer such as polyvinylidene fluoride (PVDF) or Kynar®, etc. The inner part 101 can include a hub 110 and one or more partial blades secured to the hub 110. In various implementations, the partial blades 111, 112, 113, 114 can form spokes emanating from the center of the hub 110. In this example, partial blade 111 includes a support portion 111a (e.g., spoke) with planar winged portions (e.g., wing-like shapes) 111b, 111c straddling the middle of the support portion 111a. Other examples are possible. For instance, the support portion 111a may have a different design than shown and/or one or both of the winged portions 111b, 111c may have a different design than shown. In FIG. 9, the winged portions 111b, 111c are similar to each other, but they could be different in shape and/or size from one another in other examples. For multiple partial blades, the partial blades can have similar or different designs from one another. For simplicity, the partial blades 111, 112, 113, 114 in FIG. 9 have similar shapes and sizes with one another. As shown in FIG. 9, a first partial blade 111 and a second partial blade 112 can be secured to the hub 110. For symmetry, the first partial blade 111 and the second partial blade 112 can be secured on opposite sides of the hub 110. In some implementations, as shown in FIG. 9, a third partial blade 113 and a fourth partial blade 114 can also be secured to the hub 110. For symmetry, the third partial blade 113 and the fourth partial blade 114 can be secured on opposite sides of the hub 110. In various designs, the four partial blades 111, 112, 113, 114 can be spaced equidistant from one another, for example, 90 degrees (e.g., substantially 90 degrees) apart from one another.

As described herein, a different number of partial blades can be secured to the hub 110. In various instances, the partial blades can be secured to the hub equidistant from one another. For example, in a design with only three partial blades secured to the hub, the three partial blades can be secured to the hub 120 degrees (e.g., substantially 120 degrees) apart from one another. Other designs are possible.

With continued reference to FIG. 9, each of the partial blades 111, 112, 113, 114 can define a respective cavity 121, 122, 123, 124 (e.g., within the spoke or support portion) configured to receive a magnet. In FIG. 9, the cavities 121, 122, 123, 124 are shaped as tubular portions (e.g., to match rod shaped magnets). However, the shape and size of the cavities 121, 122, 123, 124 can be varied, e.g., based on the design of the magnet. The shape and size of the cavities can have similar or different designs from one another. The partial blades of the inner part include partial portions of the blades (e.g., a support portion and winged portions). The partial portions of the blades can help with easier handling of the part. The partial portions of the blades can also help with alignment in a fixture and/or mold used later in the process.

Figure 11:
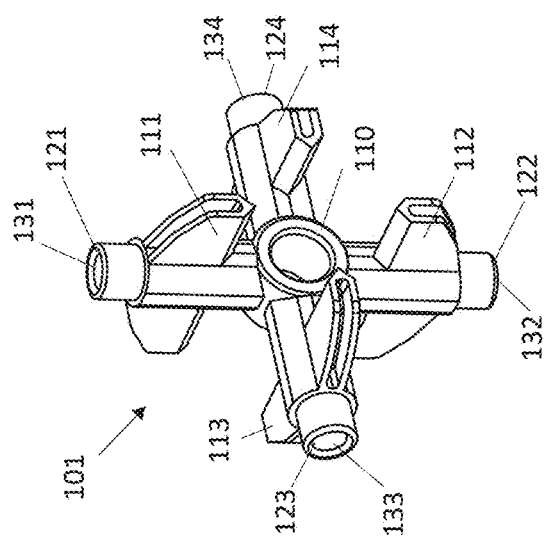
FIG. 11 shows an example inner part with inserted magnets in accordance with certain implementations described herein.
Figure 10:
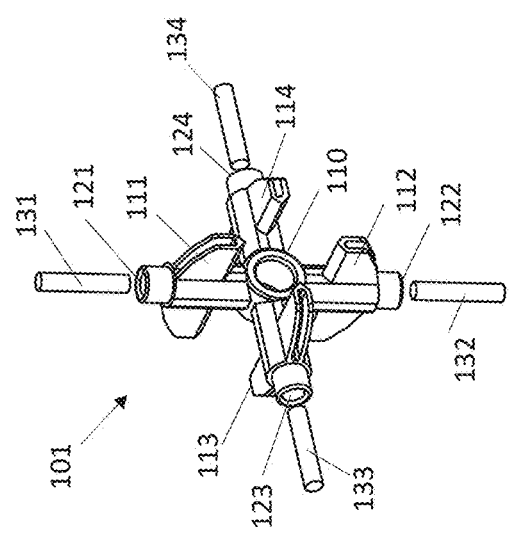
FIG. 10 shows an example inner part of a paddlewheel assembly receiving magnets in accordance with certain implementations described herein.

In FIGS. 10-11, the magnets are inserted into the inner part 101. As shown in FIGS. 10-11, a first magnet 131 can be inserted in the first cavity 121 of the first partial blade 111 and a second magnet 132 can be inserted in the second cavity 122 of the second partial blade 112. In some instances, inserting the first magnet 131 into the first cavity 121 and inserting the second magnet 132 into the second cavity 122 can occur simultaneously. In some instances, inserting the first magnet 131 into the first cavity 121 and inserting the second magnet 132 into the second cavity 122 can occur sequentially. As shown in FIGS. 10-11, a third magnet 133 can be inserted in the third cavity 123 of the third partial blade 113 and a fourth magnet 134 can be inserted in the fourth cavity 124 of the fourth partial blade 114. In some instances, inserting the third magnet 133 into the third cavity 123 and inserting the fourth magnet 134 into the fourth cavity 124 can occur simultaneously. In some instances, inserting the third magnet 133 into the third cavity 123 and inserting the fourth magnet 134 into the fourth cavity 124 can occur sequentially.

Figure 12:
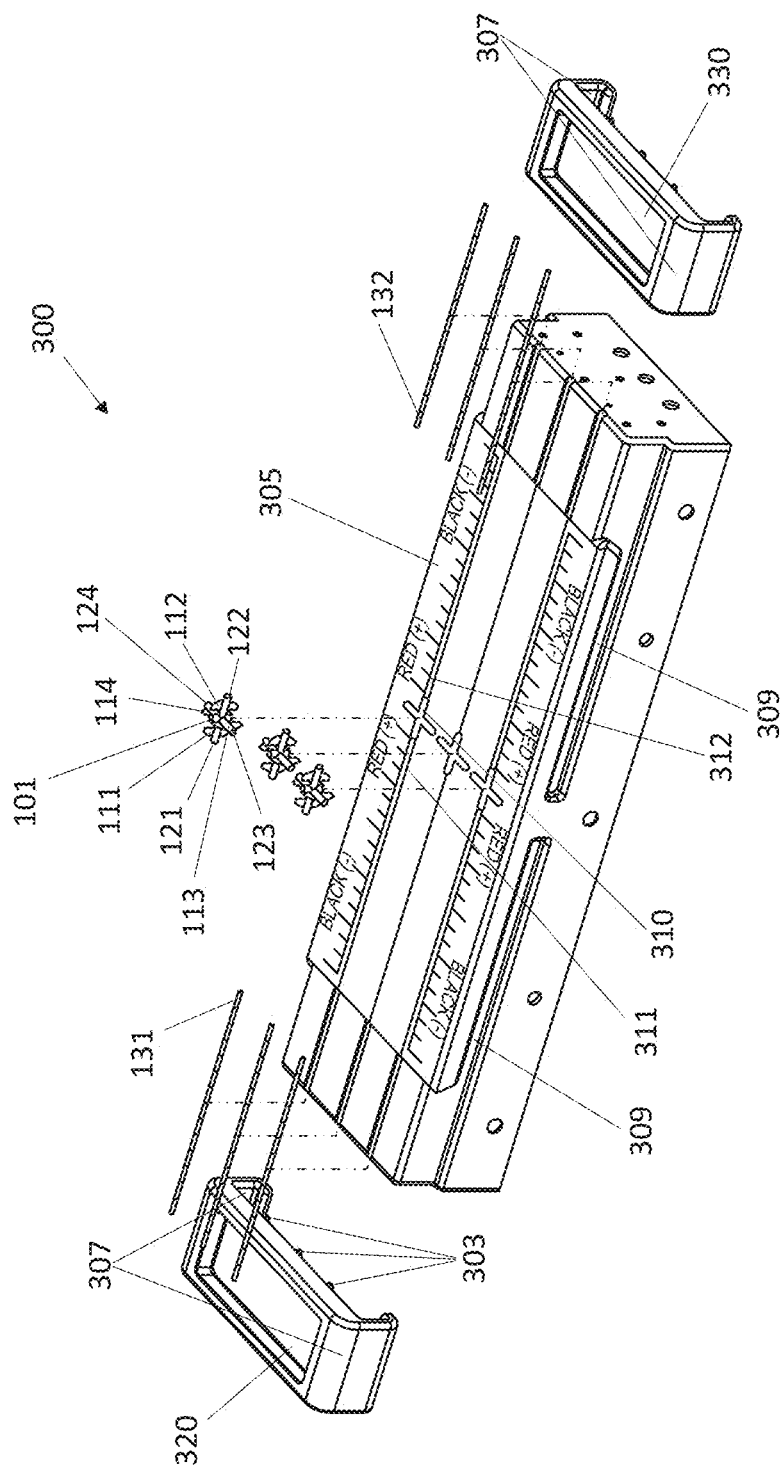
FIG. 12 shows an example installation fixture configured to insert magnets in one or more inner parts of a paddlewheel assembly in accordance with certain implementations described herein.

In some instances, the magnets can be inserted using an installation fixture or jig. For example, the fixture or jig can be used to at least partially align the magnets with the inner part of the paddlewheel to facilitate inserting of the magnets. An example installation fixture 300 is shown in FIG. 12. Other designs for the fixture 300 are possible. In FIG. 12, one or more inner parts 101 (e.g., as shown in FIG. 9) of the paddlewheel can be placed in the fixture 300. Although FIG. 12 shows three inner parts 101 placed in the fixture 300, the number of inner parts (e.g., one, two, three, four, five, six, seven, eight, nine, ten, etc.) that can be placed into the fixture 300 can be varied, e.g., based on the design of the fixture 300. In addition, for ease of illustration, FIG. 12 will be described with respect to one inner part 101. However, descriptions with respect to one inner part 101 can apply to any of the other inner parts placed in the fixture 300.

As shown in FIG. 12, the one or more inner parts 101 can be placed within a corresponding recess 310 in a body 305 of the fixture 300. As described herein, inner part 101 can include partial blades. In this example, there are four partial blades 111, 112, 113, 114 each having a respective cavity 121, 122, 123, 124 configured to receive a respective magnet.

The partial blades 111, 112, 113, 114 can help with the placement in the body 305 of the fixture 300. For example, the partial blades 111, 112, 113, 114 can help with the placement in the recess 310. The recess 310 can have a shape corresponding to the shape of the partial blades 111, 112 113, 114 (e.g., four orthogonally disposed blades). In some instances, the recess 310 can also have a shape corresponding to a support portion 111a and/or winged portions 111b, 111c of a partial blade 111 shown in FIG. 9. In some instances, the inner part 101 of the paddlewheel can be inserted into the recess 310 so that the first partial blade 111 and the second partial blade 112 can straddle the recess 310. Slots 311, 312 can extend from the recess 310 in two directions. For example, slot 311 can extend from one side of the recess 301 and slot 312 can extend from an opposite side of the recess 310. Magnets 131, 132 can also be placed in the fixture 300 (e.g., placed within the opposing slots 311, 312). In this example, two opposing cavities 121, 122 (e.g., tubular portions) of the inner part 101 can be aligned, e.g., in the recess 310, to receive the two opposing magnets 131, 132 in slots 311, 312. Two movable portions 320, 330 of the fixture 300, such as the two chassis illustrated may include rails 307 which can be moved (e.g., towards the inner part 101) longitudinally in mating tracks 309 in the body 305 to guide the movable portions 320, 330 along the body 305. Each movable portion 320, 330, can include a series of rams or pistons 303 to push the two opposing magnets 131, 132 into the cavities 121, 122 of the partial blades 111, 112 of the inner part 101 of the paddlewheel. In this example, the magnets 131, 132 to be inserted into the inner part 101 can be a part of a longer magnet which separates from the longer magnet during or after being inserted into the inner part 101. For example, in some instances, the magnets 131, 132 can snap apart from the longer magnet due to the presized notches in the longer magnet. In other examples, the size of the magnet 131, 132 to be inserted may be the same after being inserted (e.g., may not separate from a longer magnet). In this example, the magnets 131, 132 can be inserted into the inner part 101 simultaneously, e.g., as the two movable portions 320, 330 of the fixture 300 are moved at the same time towards the inner part 101. In some examples, the magnets 131, 132 can be inserted into the inner part 101 sequentially. For example, one movable portion 320 of the two movable portions 320, 330 can be moved toward the inner part 101 before the other movable portion 330 of the two movable portions 320, 330 such that one magnet 131 can be inserted in the inner part 101 before the other magnet 132. Similarly, magnets can also be inserted into other inner parts in the fixture. For example, magnets can be inserted into all the inner parts placed in the fixture simultaneously or sequentially.

After the two magnets are inserted into each of the inner parts 101 of the paddlewheel, the one or more inner parts 101 can be rotated such that the other two opposing cavities can also receive magnets. For example, partial blades 113, 114 of inner part 101 can be rotated in recess 310 such that they are aligned with slots 311, 312. Similarly, the other inner parts can also be rotated in their respective recess. The two movable portions 320, 330 of the fixture 300 can be moved towards the inner parts to insert the respective magnets.

In various designs, the cavities of the inner part can provide a mechanical connection, e.g., a press fit, with the magnets such that the magnets can remain in place as the inner part is handled, e.g., when rotated and/or taken out of the fixture 300. The polarity of the inserted magnets can be verified before, during, or after insertion into the inner part of the paddlewheel. For example, the polarity of the inserted magnets can be checked with a color coded device or another magnet. In FIG. 12, the polarity of the magnets can be checked using color coding on the body 305 of the fixture 300. For example, the inserted magnets may be color coded on the ends (e.g., red for positive and black for negative) such that one can visually inspect whether the color on the ends of the magnets match the color coding on the fixture. Additionally or alternatively, another magnet can be placed in a respective slot (e.g., 311, 312) to check the polarity of the magnets. Other verification methods are possible.

With reference to FIG. 13, the inner part 101 with inserted magnets can then be overmolded. For example the inner part 101 with the inserted magnets can be placed in one or more cavities of a mold and material can be injected into the mold to mold over the inner part 101 to form an outer part 102 of the paddlewheel 100. With reference to FIG. 9, the partial blades (e.g., support portion 111a and/or winged portions 111b, 111c) can help align and/or orient the inner part 101 within the mold. In various instances, the outer part 102 can be made with any paddlewheel material, e.g., a fluoropolymer such as polyvinylidene fluoride (PVDF) or Kynar®, etc. The material can be the same as the material used for the inner part. In some instances, the material can be different than the material used for the inner part. In various instances, a portion of the overmold outer part 102 can be molded over the cavities to retain the magnets therein. For example, overmolding can close the first and second cavities 121, 122 (shown in FIG. 11) and secure the outer part 102 to a first side 1 and a second side 2 of the hub 110. In FIG. 13, the outer part 102 extends from the first side 1 to the second side 2 of the hub 110. In some examples, overmolding can close the third and fourth cavities 123, 124 (shown in FIG. 11) and secure the outer part 102 to a third side 3 and a fourth side 4 of the hub 110. In FIG. 13, the outer part 102 extends from the third side 3 to the fourth side 4 of the hub 110. The overmold outer part 102 can form the remaining portion of the blades. In particular, the outer part 102 can provide the outer edges of a planar blade or paddle. For example, in FIG. 13, outer part 102 can include portions when combined with the first partial blade 111 (see FIGS. 9-11) of the inner part 101 forms a first full blade on the first side 1 of the paddlewheel 100. In FIG. 13, outer part 102 can also include portions that when combined with the second partial blade 112 (see FIGS. 9-11) of the inner part 101 forms a second full blade on the second side 2 of the paddlewheel 100. In FIG. 13, outer part 102 can also include portions that when combined with the third partial blade 113 (see FIGS. 9-11) of the inner part 101 forms a third full blade on the third side 3 of the paddlewheel 100. Furthermore, in FIG. 13, outer part 102 can include portions that when combined with the fourth partial blade 114 (see FIGS. 9-11) of the inner part 101 forms a fourth full blade on the fourth side 4 of the paddlewheel 100. In FIG. 13, the full blades are in the form of planar D-shaped blades. In other paddlewheels, the shape of the blades can be designed differently. As also shown in FIG. 13, the outer part 102 can provide hubs 105, 106 connecting the partial blades on the fifth and sixth sides 5, 6 of the paddlewheel 100, e.g., at a location where the extension from the first side 1 to the second side 2 intersects the extension from the third side 3 to the fourth side 4.

Figure 3:
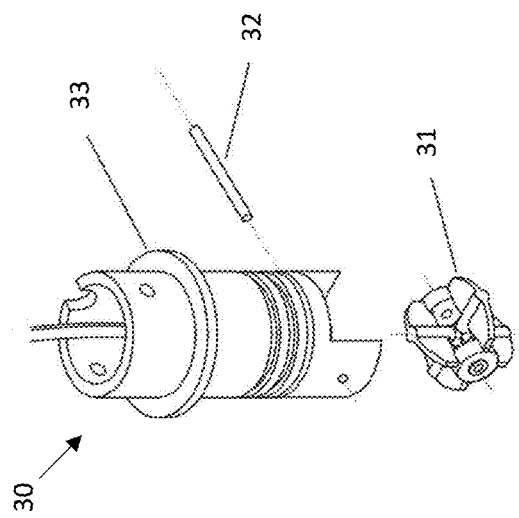
FIG. 3 shows an example paddlewheel sensor subassembly.
Figure 14:
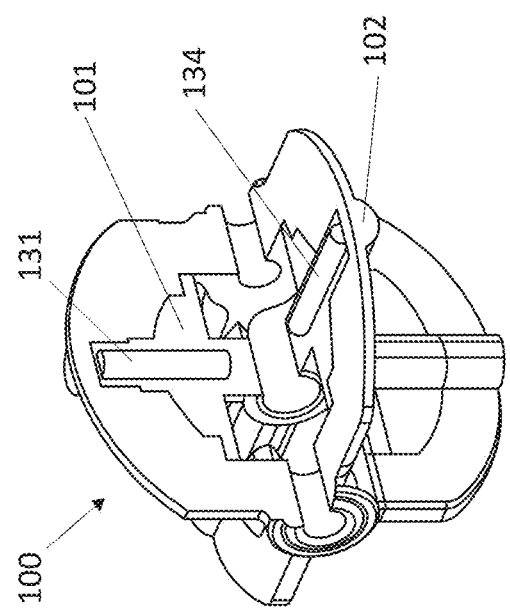
FIG. 14 shows a cutaway view of an example paddlewheel assembly in accordance with certain implementations described herein.

In various designs, the inner part 101 and outer part 102 can also provide one or more cavities 120, 125, 126 configured to receive an axle on which the paddlewheel wheel 100 can rotate within a sensor body (see e.g., FIGS. 3-4). For example, as shown in FIG. 13, the inner part 101 can include a cavity 120, e.g., in the center of the hub 110. As also shown in FIG. 13, the outer part 102 can include a cavity 125 on the fifth side 5 of the paddlewheel 100 (e.g., in the center of hub 105) and another cavity 126 on the sixth side 6 of the paddlewheel 100 (e.g., in the center of hub 106), which can both align with the cavity 120 in the hub 110. This completes the paddlewheel 100. In FIG. 14, a cutaway view shows the components of the paddlewheel 100. As shown, magnets 131, 134 are disposed in the inner part 101 and the outer portion 102 is overmolded over the inner part 101.

Accordingly, in various implementations, as shown in FIGS. 9-14, a paddlewheel assembly 100 can include a hub 110, at least two partial blades 111, 112 secured to the hub 110, and a cavity 121, 122 in each of the at least two partial blades 111, 112 configured to receive a magnet 131, 132. The paddlewheel assembly 100 can also include an outer portion 102 closing the cavity 121 122 in each of the at least two partial blades 111, 112. The outer portion can be secured to a first side 1 and a second side 2 of the hub 110. In some designs, the paddlewheel assembly 100 can also include at least two additional partial blades 113, 114 and a cavity 123, 124 in each of the at least two additional partial blades 113, 114 configured to receive a magnet 133, 134. The outer portion 102 can close the cavity 123, 124 in each of the at least two additional partial blades 113, 114. The outer portion 102 can be secured to a third side 3 and a fourth side 4 of the hub 110.

FIG. 15 shows an example method 500 of fabricating a paddlewheel for a flow meter. The method can include providing an inner part of the paddlewheel, inserting a plurality of magnets in the inner part of the paddlewheel, and overmolding an outer part of the paddlewheel over the inner part of the paddlewheel, as shown in blocks 501, 502, and 503 respectively. In various implementations, the method can be performed within 1 minute (e.g., within 55 seconds, within 50 seconds, within 45 seconds, within 40 seconds, within 35 seconds, etc.).

With respect to block 501, providing an inner part of the paddlewheel can include providing an inner part 101 as described with respect to FIGS. 9-11. For example, in some instances, the inner part of the paddlewheel can be pre-molded. In some implementations, the inner part 101 of the paddlewheel 100 can comprise a first partial blade 111 and a second partial blade 112 secured to a hub 110. In some instances, the first partial blade 111 and the second partial blade 112 can be secured on opposite sides of the hub 110. The first partial blade 111 can have a first cavity 121 configured to receive a first magnet 131. The second partial blade 112 can have a second cavity 122 configured to receive a second magnet 132. In some instances, the inner part 101 of the paddlewheel 100 can comprise a third partial blade 113 and a fourth partial blade 114 secured to a hub 110. In some instances, the third partial blade 113 and the fourth partial blade 114 can be secured on opposite sides of the hub 110. The third partial blade 113 can have a third cavity 123 configured to receive a third magnet 133. The fourth partial blade 114 can have a fourth cavity 124 configured to receive a fourth magnet 134. In some instances, the partial blades 111, 112, 113, 114 can be equidistant from one another.

With respect to block 502, inserting the plurality of magnets can include inserting the first magnet 131 into the first cavity 121 and inserting the second magnet 132 into the second cavity 122. In some instances, the magnets 131, 132 can be inserted in the respective cavities 121, 122 simultaneously or sequentially. In some instances, inserting the plurality of magnets can include inserting the third magnet 133 into the third cavity 123 and inserting the fourth magnet 134 into the fourth cavity 124. In some instances, the magnets 133, 134 can be inserted in the respective cavities 123, 124 simultaneously or sequentially.

In some instances, inserting the magnets can include inserting the inner part 101 of the paddlewheel 100 into a jig to at least partially align the magnets with the inner part 101 of the paddlewheel 100 to facilitate the inserting of the magnets. In some instances, inserting the magnets can include inserting the inner part 101 of the paddlewheel 100 into a recess in a jig so that two partial blades straddle the recess. The jig can be used to assist the insertion of the magnets in the inner part 101 of the paddlewheel 100.

With respect to block 503, as described with respect to FIGS. 12-14, overmolding can comprise closing the first cavity 121 and the second cavity 122 and securing the outer part 102 to a first side 1 and a second side 2 of the hub 110. In some instances, overmolding can comprise closing the third cavity 123 and the fourth cavity 124 and securing the outer part 102 to a third side 3 and a fourth side 4 of the hub 110. In some instances, prior to overmolding the outer part 102 over the inner part 101, the method 500 can include checking the polarity of the magnets.

Compared to the assembly process described with respect to FIGS. 5-8, the molded paddlewheel is much more robust, e.g., stronger and more precise. In many implementations, adhesives and/or soldering are not necessary.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A method of fabricating a paddlewheel for a flow meter, the method comprising:
    providing an inner part of the paddlewheel, wherein the inner part of the paddlewheel comprises a hub, a first partial blade and a second partial blade, the first partial blade comprising a first spoke extending from the hub and a first winged portion extending from the first spoke and the second partial blade comprising a second spoke extending from the hub and a second winged portion extending from the second spoke, the first partial blade defining a first cavity and the second partial blade defining a second cavity;
    inserting a plurality of magnets in the inner part of the paddlewheel, by inserting a first magnet into the first cavity of the first partial blade and inserting a second magnet into the second cavity of the second partial blade; and
    overmolding an outer part of the paddlewheel over the inner part of the paddlewheel by (1) forming a first outer blade portion extending from the first partial blade thereby closing the first cavity and (2) forming a second outer blade portion extending from the second partial blade, thereby closing the second cavity.

2. The method of claim 1, wherein the inner part of the paddlewheel is pre-molded.

3. The method of claim 1, further comprising inserting said inner part of said paddlewheel into a jig and using said jig to at least partially align said plurality of magnets with the inner part of the paddlewheel to facilitate said inserting of the plurality of magnets.

4. The method of claim 1, wherein the first partial blade and the second partial blade are secured on opposite sides of the hub.

5. The method of claim 4, further comprising inserting said inner part of said paddlewheel into a recess in a jig so that said first partial blade and said second partial blade straddle the recess and using said jig to assist the insertion of the plurality of magnets in the inner part of the paddlewheel.

6. The method of claim 4, wherein the first spoke defines the first cavity, wherein inserting the first magnet into the first cavity of the first partial blade comprises inserting the first magnet into the first cavity defined by the first spoke, and wherein inserting the second magnet into the second cavity of the second partial blade comprises inserting the second magnet into the second cavity defined by the second spoke.

7. The method of claim 6, wherein inserting the plurality of magnets comprises inserting the first magnet into the first cavity and inserting the second magnet into the second cavity simultaneously.

8. The method of claim 4, wherein the inner part of the paddlewheel comprises a third partial blade and a fourth partial blade secured to the hub wherein the third partial blade comprises a third cavity configured to receive a third magnet of the plurality of magnets and the fourth partial blade comprises a fourth cavity configured to receive a fourth magnet of the plurality of magnets, and wherein inserting the plurality of magnets comprises inserting the third magnet into the third cavity and inserting the fourth magnet into the fourth cavity simultaneously.

9. The method of claim 8, wherein the third partial blade and the fourth partial blade extend from opposite sides of the hub.

10. The method of claim 8, wherein overmolding comprises closing the third cavity and the fourth cavity and securing the outer part to the third partial blade and the fourth partial blade.

11. The method of claim 1, further comprising checking the polarity of the magnets prior to overmolding the outer part over the inner part.

12. The method of claim 1, wherein the method is performed within 1 minute.

13. The method of claim 12, wherein the method is performed within 45 seconds.

* * * * *